United States Patent
Okumura et al.

(10) Patent No.: US 8,541,118 B2
(45) Date of Patent: Sep. 24, 2013

(54) LITHIUM-ION BATTERY AND METHOD FOR REGENERATING THE SAME

(75) Inventors: Takefumi Okumura, Hitachinaka (JP); Ryo Inoue, Hitachinaka (JP); Toshio Abe, Tokai (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 13/004,148

(22) Filed: Jan. 11, 2011

(65) Prior Publication Data

US 2011/0171501 A1    Jul. 14, 2011

(30) Foreign Application Priority Data

Jan. 13, 2010   (JP) ................................. 2010-005088

(51) Int. Cl.
*H01M 10/42*   (2006.01)

(52) U.S. Cl.
USPC ................................. 429/49; 429/61; 429/63

(58) Field of Classification Search
USPC ........................... 429/49, 61, 63, 64, 113, 116
See application file for complete search history.

(56) References Cited

U.S. PATENT DOCUMENTS

| | | | |
|---|---|---|---|
| 7,255,960 B1 * | 8/2007 | Dow et al. | 429/63 X |
| 7,635,542 B2 * | 12/2009 | Kitao et al. | 429/331 |

FOREIGN PATENT DOCUMENTS

| | | |
|---|---|---|
| JP | 2006-286312 | 10/2006 |
| JP | 2009-501419 | 1/2009 |
| WO | WO 2007/008006 A1 | 1/2007 |

OTHER PUBLICATIONS

JP Office Action of Appln. No. 2010-005088 dated May 15, 2012.
Hitoshi Ota et al., Analysis of Vinylene Carbonate Derived SEI Layers on Graphite Anode, Journal of The Electrochemical Society,151 (10), 2004, pp. A1659-A1669.

* cited by examiner

*Primary Examiner* — Stephen J. Kalafut
(74) *Attorney, Agent, or Firm* — Antonelli, Terry, Stout & Kraus, LLP.

(57) ABSTRACT

This invention provides a lithium-ion battery in which a coating film forming agent degradation reaction is prevented. A lithium-ion battery 100 in which electrodes 1 and 2 and an electrolyte are accommodated in a battery container 13, and which has a means of for adding a coating film forming agent 20 for adding a coating film forming agent 21 that forms a coating film on the surface of each of electrodes 1 and 2 to an electrolyte in a battery container 13 is provided. With the use of such means of adding a coating film forming agent 20, a reaction of electrochemical degradation of a coating film forming agent 21 is prevented, allowing long-term preservation. Also, with the addition of a coating film forming agent 21 to an electrolyte, a deteriorated coating film on the surface of each of electrodes 1 and 2 is repaired such that a lithium-ion battery 100 can be regenerated, resulting in extension of battery life.

6 Claims, 3 Drawing Sheets

LITHIUM-ION BATTERY AND METHOD FOR REGENERATING THE SAME

BACKGROUND OF THE INVENTION

1. Field of the Invention

The present invention relates to a lithium-ion battery and a method for regenerating the same.

2. Background Art

In view of environmental protection and energy conservation, hybrid vehicles, in which engines and motors are used in combination as power sources, have been developed and commercialized. In addition, for the future, fuel cell hybrid vehicles, in which fuel cells are used instead of engines, are being actively developed.

For hybrid vehicles, the use of secondary batteries which can be electrically charged and discharged in a repetitive manner as power sources is essential technology. Among secondary batteries, in particular, lithium ion (secondary) batteries are characterized by high operating voltage and high energy density that facilitates achievement of high output. Therefore, lithium ion secondary batteries are increasingly growing in importance as power sources of hybrid vehicles for the future.

A technical object for lithium-ion batteries used as hybrid vehicle power sources is to prevent an increase in resistance during high temperature storage at 50° C. or more.

Hitherto, in order to prevent an increase in resistance during high temperature storage, the addition of a compound such as vinylene carbonate to an electrolyte has been suggested.

For example, Journal of The Electrochemical Society, 151 (10) A1659-A1669 (2004) suggests a battery which can be prevented from deteriorating during storage at 60° C. with the addition of vinylene carbonate (2 wt %) to an electrolyte comprising $LiPF_6$, ethylene carbonate, and dimethyl carbonate that results in formation of a coating film on the surface of a negative electrode.

SUMMARY OF THE INVENTION

However, it has been revealed that battery deterioration can be prevented at the initial phase of storage at 60° C. by a technique of using vinylene carbonate proposed as a conventional coating film forming agent, while on the other hand, vinylene carbonate degradation reaction proceeds in an electrolyte during long-term preservation, resulting in advanced battery deterioration. Therefore, a coating film forming agent cannot be preserved in an electrolyte for a long period of time and therefore it has been unable to extend the lithium-ion battery life, which has been problematic.

An object of the present invention is to provide a lithium-ion battery in which a coating film forming agent degradation reaction can be prevented and a method for regenerating the same.

The lithium-ion battery of the present invention whereby the above object can be achieved is a lithium-ion battery, in which electrode bodes and an electrolyte are accommodated in a battery container, and which has a means of adding a coating film forming agent for adding a coating film forming agent that forms a coating film on the surface of each electrode body to the electrolyte in the battery container.

In addition, the method for regenerating a lithium-ion battery of the present invention whereby the above object can be achieved is a method for regenerating a lithium-ion battery in which electrode bodies and an electrolyte are accommodated in a battery container, comprising adding a coating film forming agent that forms a coating film on the surface of each electrode body to the electrolyte in the battery container.

According to the present invention, a lithium-ion battery has a means of adding a coating film forming agent for adding a coating film forming agent that forms a coating film on the surface of an electrode body to an electrolyte in a battery container. Therefore, it is not necessary for an electrolyte to initially contain a coating film forming agent. Accordingly, a coating film forming agent degradation reaction in an electrolyte can be prevented. In addition, a deteriorated coating film on the electrode body surface can be repaired by adding a coating film forming agent to an electrolyte. Therefore, battery life of a lithium-ion battery can be extended.

A coating film forming agent is housed by an accommodating means in a manner such that the agent is isolated from an electrolyte. This does not cause electrochemical degradation reaction and therefore a coating film forming agent can be preserved for a long period of time. A deteriorated film on the negative electrode surface can be repaired by releasing a coating film forming agent housed as described above in an electrolyte by external force. Accordingly, a lithium-ion battery which can be prevented from deteriorating during long-term storage at 60° C. can be provided.

DESCRIPTION OF NUMERICAL REFERENCES

Figure 1:
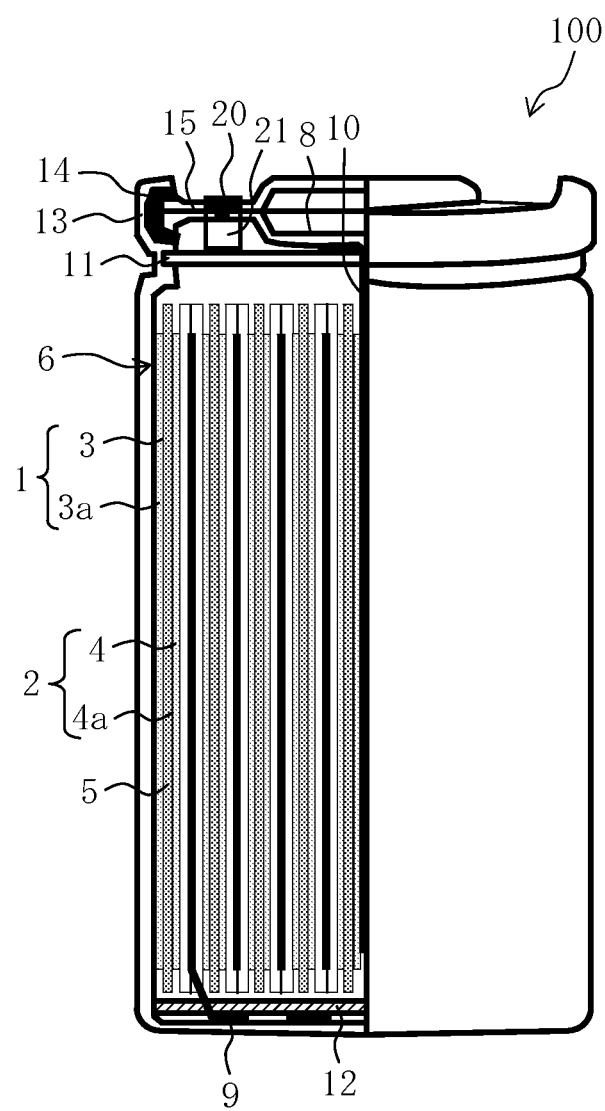
FIG. 1 shows a sectional view of a part of a lithium-ion battery in one embodiment of the present invention.

100: lithium-ion battery
1: positive electrode
2: negative electrode
3: positive electrode current collector
3a: positive electrode mixture layer
4: negative electrode current collector
4a: negative electrode mixture layer
5: separator
6: electrode coil group
8: current cut-off valve
9: negative electrode lead
10: positive electrode lead
11: positive electrode insulator
12: negative electrode insulator
13: battery container
14: gasket
15: battery cover
20: means of adding a coating film forming agent
21: coating film forming agent
22: housing means
23: capsule
24: releasing means
25: T-shaped jig
26: controller

DETAILED DESCRIPTION OF THE PREFERRED EMBODIMENTS

Next, embodiments of the present invention are described.

FIG. 1 shows a sectional view of a lithium-ion battery in one embodiment of the present invention.

As shown in FIG. 1, in a lithium-ion battery 100, electrodes 1 and 2 and an electrolyte are accommodated in a battery container 13, and a lithium-ion battery 100 has a means of adding a coating film forming agent 20 for adding a coating film forming agent 21 that forms a coating film on the surface of each of the electrodes 1 and 2 to the electrolyte in the battery container 13.

The lithium-ion battery 100 has an electrode coil group 6 prepared by superposing a positive electrode 1 and a negative electrode 2 via a separator 5 and winding the electrodes into a coiled form.

An electrode coil group 6 is inserted into a battery container 13 consisting of a bottomed cylindrical battery can and accommodated therein. A tab of a negative electrode lead 9 led out from the bottom side of the electrode coil group 6 is welded to the bottom portion of the battery container 13, and a tab of a positive electrode lead 10 led out from the top side of the electrode coil group 6 is welded to a battery cover 15. Then, an electrolyte comprising a nonaqueous solvent is introduced into the battery container 13. The battery cover 15 is attached to an opening of the battery container 13 via an insulating gasket 14, followed by fixation via swaging.

For an electrolyte, a mixed solvent comprising a high-polarity solvent, a low-polarity solvent, and the above coating film forming agent 21, and a lithium salt are used. Examples of a high-polarity solvent that can be used include propylene carbonate (PC), ethylene carbonate (EC), trifluoropropylene carbonate (TFPC), chloroethylene carbonate (ClEC), fluoroethylene carbonate (FEC), trifluoroethylene carbonate (TFEC), difluoroethylene carbonate (DFEC), and vinyl ethylene carbonate (VEC).

Particularly preferably, EC is used in view of coating film formation on a negative electrode. Also, the addition of a small amount of ClEC, FEC, TFEC, or VEC (2 vol % or less) contributes to electrode coating film formation. In such case, good cycle performance can be realized. Further, a small amount of TFPC or DFEC (2 vol % or less) may be added in view of coating film formation on a positive electrode.

Examples of a low-polarity solvent that can be used include dimethyl carbonate (DMC), ethyl methyl carbonate (EMC), diethyl carbonate (DEC), methyl propyl carbonate (MPC), ethyl propyl carbonate (EPC), trifluoromethyl ethyl carbonate (TFMEC), and 1,1,1-trifluoroethyl methyl carbonate (TFEMC). DMC is a highly compatible solvent and it is preferably mixed with EC or the like and used. DEC has a lower melting point than that of DMC and it is preferable in terms of low temperature performance (−30° C.). EMC has an asymmetric molecular structure and a low melting point. Therefore, it is preferable in terms of low temperature performance. Each of EPC and TFMEC has propylene side chains and an asymmetric molecular structure and thus it is preferably used as a solvent for controlling low temperature performance.

TFEMC molecules are partially fluorinated such that the dipole moment becomes large. Therefore, TFEMC is preferable for maintenance of dissociation properties of lithium salt at low temperatures and therefore it is preferable in terms of low temperature performance. Regarding the electrolyte mixing rate, the composition rate of a high-polarity solvent is 18.0 to 30.0 vol %, the composition rate of a low-polarity solvent is 74.0 to 81.8 vol %, and the composition rate of a coating film forming agent 21 is 0.1 to 1.0 vol %. Here, if the composition rate of a coating film forming agent 21 is 1.0 vol % or more, resistance inside a battery increases, causing battery output reduction. This is not preferable.

The lithium salt used for an electrolyte is not particularly limited. However, examples of a lithium salt that can be used include inorganic lithium salts such as $LiPF_6$, $LiBF_4$, $LiClO_4$, Lei, Lick, and Libra and organic lithium salts such as Lab$[OCOCF_3]_4$, Lab$[OCOCF_2CF_3]_4$, $LiPF_4(CF_3)_2$, Line $(SO_2CF_3)_2$, and Line $(SO_2CF_2CF_3)_2$. In particular, $LiPF_6$, which is often used for commercially available batteries, is a preferable material in terms of product quality stability. In addition, Lab$[OCOCF_3]_4$ is a useful material because it has excellent dissociation properties and solubility and thus exhibits high conductivity at low concentrations.

A positive electrode 1 is formed by applying a positive electrode mixture layer 3a composed of a positive electrode active material, an electronically conductive material, and a binder to aluminum foil used as a positive electrode current collector 3. In addition, in order to reduce electronic resistance, a conductive agent may be further added to a positive electrode mixture layer 3a.

A positive electrode active material is preferably a lithium composite oxide represented by the composition formula of $Li_\alpha Mn_x M1_y M2_z O_2$ (wherein M1 denotes at least one member selected from Co and Ni, M2 denotes at least one member selected from among Co, Ni, Al, B, Fe, Mg, and Cr, and the following conditions are satisfied: $x+y+z=1$; $0<\alpha<1.2$; $0.2 \leq x \leq 0.6$; $0.2 \leq y \leq 0.4$ and $0.05 \leq z \leq 0.4$). In addition, it is particularly preferable that M1 is Ni or Co and M2 is Co or Ni. $LiMn_{1/3}Ni_{1/3}Co_{1/3}/O_2$ is further preferable. In the composition, if the Ni content is increased, battery capacity can be increased. If the Co content is increased, output at low temperatures can be improved. If the Mn content is increased, material cost can be reduced. In addition, an additive element is effective for stabilizing cycle performance. In another case, an orthorhombic phosphate compound with space group symmetry (Pmnb) represented by the general formula $LiM_x$, $PO_4$ (M: Fe or Mn; $0.01 \leq X \leq 0.4$) or $LiMn_{1-x}M_xPO_4$ (M: divalent cation other than Mn; $0.01 \leq X \leq 0.4$) may be used as the above material.

In particular, $LiMn_{1/3}Ni_{1/3}Co_{1/3}O_2$ has excellent low temperature performance and cycle stability and thus it is preferable as a lithium-ion battery material for hybrid electric vehicles (HEVs) and electric vehicles (HVs).

As the above binder, any binder may be used as long as it can cause adhesion between a material that constitutes a positive electrode 1 and a positive electrode current collector 3. Examples thereof include: homopolymers or copolymers of vinylidene fluoride, ethylene tetrafluoride, acrylonitrile, ethylene oxide, and the like; and styrene-butadiene rubber. Examples of a conductive agent include carbon materials such as carbon black, graphite, carbon fibers, and metal carbide, which may be used alone or in combination.

A negative electrode 2 is formed by applying a negative electrode mixture layer 4a composed of a negative electrode active material and a binder to copper foil used as a negative electrode current collector 4. In addition, in order to reduce electronic resistance, a conductive agent may be further added to a negative electrode mixture layer 4a.

Examples of the negative electrode active material that can be used include: a naturally occurring graphite; a carbonaceous composite material obtained by forming a coating film on naturally occurring graphite by a dry CVD (Chemical Vapor Deposition) method or a wet spraying method; an artificial graphite produced by burning an epoxy or phenol resin material or a pitch-based material obtained from petrol or coal as a raw material; a carbonaceous material such as an amorphous carbon material; a lithium metal capable of storing/releasing lithium by forming a compound with lithium; silicone capable of storing/releasing lithium when inserted into a crystalline structure by forming a compound with lithium, oxides or nitrides of group IV elements such as germanium and tin.

In general, the above examples are sometimes referred to as negative electrode active materials. In particular, a carbonaceous material has high conductivity and therefore it is excellent in terms of low temperature performance and cycle stability. As a carbonaceous material, a material with wide interlayer spacing ($d_{002}$) for carbon layer, which is excellent in terms of rapid charge/discharge performance and low temperature performance, is preferable.

However, such material with wide interlayer spacing ($d_{002}$) for carbon layer might cause capacity reduction at the beginning of charging or low recharging/discharging efficiency. Therefore, the interlayer spacing ($d_{002}$) for carbon layer is preferably 0.390 nm or less. A carbonaceous material having such feature may be referred to as "pseudo-isotropic carbon." Further, an electrode may be composed by mixing in a highly conductive carbonaceous material such as graphite material, amorphous material, activated carbon. Alternatively, as graphite material, a material having characteristics (1) to (3) described below may be used.

(1) The R value ($I_D/I_G$), which is the strength ratio between the peak intensity ($I_D$) within a range of 1300 to 1400 cm$^{-1}$ determined by Raman scattering spectroscopy and the peak strength ($I_G$) within a range of 1580 to 1620 cm$^{-1}$ determined by Raman scattering spectroscopy is 0.20 to 0.40.

(2) The peak half bandwidth ($\Delta$ value) within a range of 1300~1400 cm$^{-1}$ determined by Raman scattering spectroscopy is 40 cm$^{-1}$ to 100 cm$^{-1}$.

(3) The strength ratio (X value: $I_{(110)}/I_{(004)}$) between the (110) face peak strength ($I_{(110)}$) and the (004) face peak strength ($I_{(004)}$) determined by X-ray diffraction is 0.10 to 0.45.

Any binder may be used as long as it can cause adhesion between a material that constitutes a negative electrode 2 and a negative electrode current collector 4. Examples thereof include: monopolymers and copolymers of vinylidene fluoride, ethylene tetrafluoride, acrylonitrile, ethylene oxide, and the like; and styrene-butadiene rubber.

Examples of the above conductive agent include carbon materials such as carbon black, graphite, carbon fibers, and metal carbide, which may be used alone or in combination.

Figure 2:
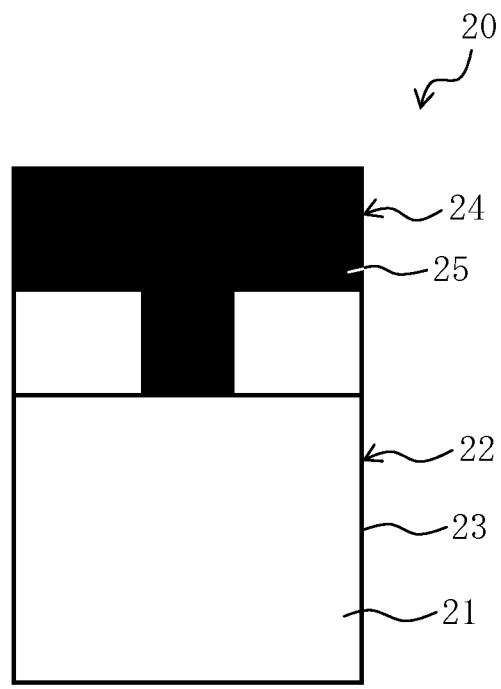
FIG. 2 shows a specific example of a means of adding a coating film forming agent.

FIG. 2 shows a specific example of a means of adding a coating film forming agent.

A means of adding a coating film forming agent 20 has a housing means 22 for housing a coating film forming agent 21 isolated from an electrolyte in a battery container 13 and a releasing means 24 for releasing the coating film forming agent 21 from the housing means 22 into the electrolyte.

Examples of a coating film forming agent 21 that can be used include vinylene carbonate (VC), methylvinylene carbonate (MVC), dimethylvinylene carbonate (DMVC), ethylvinylene carbonate (EVC), diethylvinylene carbonate (DEVC), and dimethacryl carbonate (DMAC). It is thought that VC has a small molecular weight and thus a fine electrode coating film can be formed therewith. For example, a low density electrode coating film can be formed with MVC, DMVC, EVC, or DEVC, which is VC with a substitution of alkyl groups, according to the alkyl chain size. Therefore, such VC is effective for the improvement of low temperature performance.

According to a method for housing a coating film forming agent 21 by a housing means 22, the agent is preferably contained in film a capsule 23 comprising a plastic such as a poorly soluble polyethylene, polypropylene, or a fluorine resin in an electrolyte. Preferably, a capsule 23 is accommodated inside a battery cover 15 provided to the upper portion of a lithium-ion battery 100 or a cap of a liquid inlet.

In order to release a coating film forming agent 21 into an electrolyte by a releasing means 24, a T-shaped jig 25 is pressed to apply external force to a housing means 22 so as to break a capsule 23, and thereby ejecting a coating film forming agent 21 into the electrolyte. A procedure of pressing a T-shaped jig 25 can be performed manually or automatically by an actuator.

Figure 3:
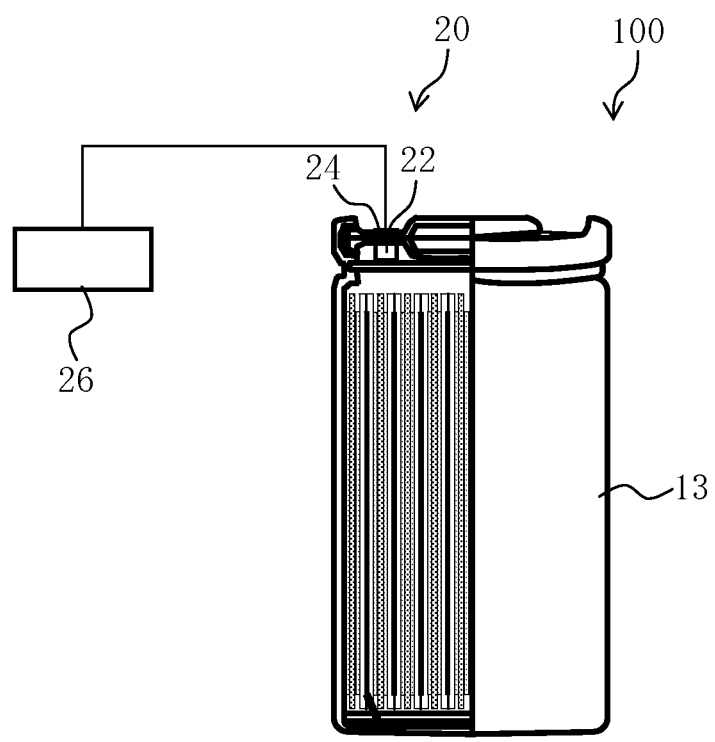
FIG. 3 shows the status of connection between a controller and an actuator.

For instance, an actuator is used, as shown in FIG. 3, a controller (controlling means) 26 is connected to an actuator and it is determined with the use of a controller 26 whether or not conditions predetermined based on the status of a lithium-ion battery 100 are satisfied. If it is determined that the conditions are satisfied, an actuator is controlled to perforate a capsule 23 by a T-shaped jig 25 and thus a coating film forming agent 21 can be released.

In view of the above, in one embodiment of the present invention, a lithium-ion battery 100 has a means of adding a coating film forming agent 20 for adding a coating film forming agent 21 for coating film formation to the surfaces of electrodes 1 and 2 in an electrolyte contained in a battery container 13. Therefore, a coating film is newly formed on the surfaces of electrodes 1 and 2 by adding a coating film forming agent 21 to an electrolyte such that the deteriorated coating film on the surface of each of the electrodes 1 and 2 can be repaired. Accordingly, a lithium-ion battery 100 is regenerated and battery life can be extended.

Whether or not a coating film forming agent 21 is added to an electrolyte can be determined based on conditions of predetermined timing or temperature. For instance, if the expected battery life of a lithium-ion battery 100 is 10 years, conditions can be predetermined in a manner such that when about 5 years that correspond to half of the expected battery life have passed, a coating film forming agent 21 is added to an electrolyte.

With the use of the lithium-ion battery 100 in this embodiment, a lithium ion battery that is prevented from deteriorating during log-term storage at 60° C. compared with conventional lithium-ion batteries can be provided. Such lithium ion battery can be widely used for power sources of hybrid vehicles and electric control systems for vehicles and back-up power sources, which are probably exposed to high temperatures of 60° C. or more. Such battery is preferably used for power sources of industrial equipments such as electric tools and forklifts.

In addition, in the above embodiment, an example in which a means of adding a coating film forming agent 20 is composed of a housing means 22 and a releasing means 24. However, a means of adding a coating film forming agent 20 may have a configuration that allows addition of a coating film forming agent to an electrolyte.

For example, a housing means 22 itself may have a configuration that allows release of a coating film forming agent into an electrolyte over time or when the temperature reaches a predetermined temperature. As a result, a releasing means 24 can be omitted. Then, the structure can be simplified.

In addition, as a means of adding a coating film forming agent 20, an inlet through which a coating film forming agent 21 can be introduced is provided to a battery container 13 such that a coating film forming agent may be introduced from the inlet. In such case, both a housing means 22 and a releasing means 24 can be omitted. Thus, the structure can be further simplified.

Hereinafter, preferred embodiments of the present invention are described with reference to specific examples.

EXAMPLE 1

<Battery Production>

A lithium-ion battery 100 was produced in this Example by the method described below.

First, a positive electrode material paste was prepared with the use of $LiMn_{1/3}Ni_{1/3}Co_{1/3}O_2$ as a positive electrode active material, carbon black (CB1) and graphite (GF2) as electronically conductive materials, polyvinylidene fluoride (PVDF) as a binder, and NMP (N-methyl pyrrolidone) as a solvent such that the component ratio in terms of the dry solid weight became $LiMn_{1/3}Ni_{1/3}Co_{1/3}O_2$: CB1:GF2:PVDF=86:9:2:3.

The obtained positive electrode material paste was applied to aluminum foil used as a positive electrode current collector 3. The obtained product was dried at 80° C., pressed by a pressure roller, and then dried at 120° C. Accordingly, a positive electrode mixture layer 3a was formed on the positive electrode current collector 3. Thus, a positive electrode 1 was prepared.

Next, a negative electrode material paste was prepared with the use of a pseudo-isotropic carbon (amorphous carbon) as a negative electrode active material, carbon black (CB2) as a conductive material, PVDF as a binder, and NMP as a solvent such that the component ratio in terms of the dry solid weight became pseudo-isotropic carbon: CB2:PVDF=88:5:7.

The obtained negative electrode material paste was applied to copper foil used as a negative electrode current collector 4. The obtained product was dried at 80° C., pressed by a pressure roller, and dried at 120° C. Accordingly, a negative electrode mixture layer 4a was formed on the negative electrode current collector 4. Thus, a negative electrode 2 was prepared.

An electrolyte used herein was prepared by dissolving 1 M $LiPF_6$ serving as a lithium salt in a mixture (composition ratio in terms of volume: EC:VC:DMC:EMC=20:0.8:39.6:39.6) used as a solvent.

A separator 5 was sandwiched between the positive electrode 1 and the negative electrode 2 prepared above to form an electrode coil group 6. The electrode coil group 6 was inserted into a battery container 13. Then, one end of a nickel-made negative electrode lead 9 was welded to a negative electrode current collector 4 and the opposite end thereof was welded to a battery container 13 for power collection of the negative electrode 2. In addition, for power collection of the positive electrode 1, one end of an aluminum-made positive electrode lead 10 was welded to a positive electrode current collector 3 and the opposite end thereof was welded to a current cut-off valve 8. The positive electrode lead 10 was further electrically connected to a battery cover 15 via a current cut-off valve 8. The battery cover 15 was provided with a means of adding a coating film forming agent 20.

A housing means 22 of a means of adding a coating film forming agent 20 was provided with a polyethylene capsule 23 filled with VC as a coating film forming agent 21. Further, the electrolyte was introduced into a battery container 13 and swaged. Thus, a lithium-ion battery 100 having coil-type electrodes was prepared.

In addition, numerical references 11 and 12 denote a positive electrode insulator and a negative electrode insulator, respectively in FIG. 1.

<Battery Preservation Conditions>

The lithium-ion battery 100 was charged at a constant current of 0.7 A to 4.1 V and then further charged at a constant voltage of 4.1 V to a current value of 20 mA. After suspension of operation for 30 minutes, the battery was electrically discharged at 0.7 A to 2.7 V. This procedure was repeated 3 times. Next, the lithium-ion battery 100 was charged at constant current of 0.7 A to 4.1 V and further charged at a constant voltage of 4.1 V to a current value of 20 mA. The charged status was maintained. The preservation temperature was set to 65° C. On Day 50 after the start of preservation, the coating film forming agent was released by a means of adding a coating film forming agent 20. An actuator of a T-shaped jig 17 (not shown) was controlled by a controller 26 so as to break a capsule 23 contained in the battery container 13, and thereby releasing the coating film forming agent 21 in the capsule 23 into the electrolyte.

<Battery Evaluation>

DC resistance (DCR: Direct Current Resistance) of the prepared lithium-ion battery 100 at 25° C. was evaluated before battery preservation and on Day 100 of preservation.

<DC Resistance Evaluation Method>

A lithium-ion battery 100 was charged at a constant current of 0.7 A to 3.8 V and electrically discharged at 10 A for 10 s. Then, the battery was charged again at the constant current to 3.8 V and electrically discharged at 20 A for 10 s. Further, the battery was charged again to 3.8 V and electrically discharged at 30 A for 10 s. Based on the I-V characteristics in this case, DC resistance of the battery was evaluated. The initial DCR was 65 mΩ. The DCR increase was 14% on Day 100 of preservation.

EXAMPLE 2

Battery preparation and evaluation were carried out in the manner described in Example 1 except that DMAC was used as a coating film forming agent. Table 1 lists the results. The initial DCR was 66 mΩ. The DCR increase was 10% on Day 100 of preservation.

Comparative Example 1

Battery preparation and evaluation were carried out in the manner described in Example 1 except that a coating film forming agent was not released from a means of adding a coating film forming agent 20. The initial DCR was 65 mΩ. The DCR increase was 20% on Day 100 of preservation.

Comparative Example 2

Battery preparation and evaluation were carried out in the manner described in Example 2 except that a coating film forming agent was not released from a means of adding a coating film forming agent 20. The initial DCR was 66 mΩ. The DCR increase was 18% on Day 100 of preservation.

It is understood that resistance increase was inhibited in the lithium-ion battery 100 in Example 1 or 2, in which a coating film forming agent was released from a means of adding a coating film forming agent 20, to a greater extent than that in the lithium-ion battery in Comparative Example 1 or 2. As described above, based on the results obtained in Examples 1 and 2, a lithium-ion battery 100 that is prevented from deteriorating during high temperature storage at 60° C. or more can be provided.

What is claimed is:

1. A lithium-ion battery, comprising:
   electrode bodies and an electrolyte accommodated in a battery container; and
   a means of adding a coating film forming agent for adding a coating film forming agent that forms a coating film on the surface of each electrode body to the electrolyte in the battery container, the means of adding a coating film forming agent comprising a housing means for housing the coating film forming agent isolated from the electrolyte in the battery container and a releasing means for releasing the coating film forming agent from the housing means into the electrolyte, the releasing means comprising an actuator for applying external force to the housing means, thereby allowing the coating film forming agent to be released from the housing means and a controlling means for determining whether or not conditions predetermined based on the lithium-ion battery status are satisfied, controlling the actuator if it is determined that the conditions are satisfied, and thereby releasing the coating film forming agent from the housing means.

2. A lithium-ion battery, comprising:

electrode bodies and an electrolyte accommodated in a battery container; and a means of adding a coating film forming agent for adding a coating film forming agent that forms a coating film on the surface of each electrode body to the electrolyte in the battery container, the means of adding a coating film forming agent comprising a housing means for housing the coating film forming agent isolated from the electrolyte in the battery container and a releasing means for releasing the coating film forming agent from the housing means into the electrolyte, the releasing means having a configuration whereby external force is manually applied to the housing means from the exterior of the battery container so as to allow the coating film forming agent to be released from the housing means.

3. The lithium-ion battery according to claim 1, wherein the means of adding a coating film forming agent has an inlet through which the coating film forming agent can be introduced into the battery container.

4. A method for regenerating the lithium-ion battery according to claim 1, comprising controlling the actuator to allow the coating film forming agent to be released from the housing means, thereby adding the coating film forming agent to the electrolyte in the battery container.

5. The lithium-ion battery according to claim 2, wherein the means of adding a coating film forming agent has an inlet through which the coating film forming agent can be introduced into the battery container.

6. A method for regenerating the lithium-ion battery according to claim 2, comprising applying an external force to the housing means from the exterior of the battery container so as to allow the coating film forming agent to be released from the housing means, thereby adding the coating film forming agent to the electrolyte in the battery container.

* * * * *